(12) United States Patent
Kim

(10) Patent No.: US 12,368,172 B2
(45) Date of Patent: Jul. 22, 2025

(54) HYDROGEN SUPPLY SYSTEM FOR FUEL CELL AND INSPECTION METHOD THEREOF

(71) Applicants: Hyundai Motor Company, Seoul (KR); Kia Corporation, Seoul (KR)

(72) Inventor: Jong Gyun Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 380 days.

(21) Appl. No.: 17/948,474

(22) Filed: Sep. 20, 2022

(65) Prior Publication Data

US 2023/0378497 A1    Nov. 23, 2023

(30) Foreign Application Priority Data

May 17, 2022  (KR) .......................... 10-2022-0060173

(51) Int. Cl.
*H01M 8/04* (2016.01)
*H01M 8/04225* (2016.01)
*H01M 8/0438* (2016.01)
*H01M 8/04664* (2016.01)
*H01M 8/04746* (2016.01)
*H01M 8/04955* (2016.01)

(52) U.S. Cl.
CPC ... *H01M 8/04671* (2013.01); *H01M 8/04225* (2016.02); *H01M 8/04388* (2013.01); *H01M 8/04753* (2013.01); *H01M 8/04955* (2013.01)

(58) Field of Classification Search
CPC ......... H01M 8/04671; H01M 8/04225; H01M 8/04338; H01M 8/04753
See application file for complete search history.

(56) References Cited

U.S. PATENT DOCUMENTS

2022/0311032 A1* 9/2022 Nishio .............. H01M 8/04753

FOREIGN PATENT DOCUMENTS

KR    20170139722 A    12/2017

* cited by examiner

*Primary Examiner* — Olatunji A Godo
(74) *Attorney, Agent, or Firm* — SLATER MATSIL, LLP

(57) ABSTRACT

An embodiment hydrogen supply system includes a fuel cell, a hydrogen supply line connected to an inlet side of an anode of the fuel cell, a discharge valve provided on an outlet side of the anode of the fuel cell to discharge exhaust gas of the anode of the fuel cell to an outside, and a controller configured to perform a hydrogen-line inspection mode to determine whether there is a leak in the fuel cell or the hydrogen supply line by cutting off air supply to the fuel cell, supplying hydrogen through the hydrogen supply line, and blocking the discharge valve, and opening the discharge valve to determine whether the discharge valve is defective in response to a determination that the fuel cell and the hydrogen supply line are normal.

18 Claims, 9 Drawing Sheets

HYDROGEN SUPPLY SYSTEM FOR FUEL CELL AND INSPECTION METHOD THEREOF

CROSS-REFERENCE TO RELATED APPLICATIONS

This application claims the benefit of Korean Patent Application No. 10-2022-0060173, filed on May 17, 2022, which application is hereby incorporated herein by reference.

TECHNICAL FIELD

The present disclosure relates to a hydrogen supply system for a fuel cell and an inspection method thereof.

BACKGROUND

A fuel cell system mainly includes a fuel cell, an air supply system, a hydrogen supply system, and a heat and water management system. Among them, the hydrogen supply system performs a process of supplying hydrogen to the fuel cell or discharging hydrogen to the outside. The hydrogen supply system is provided with a hydrogen tank in which fuel, i.e., hydrogen, is stored, and the fuel cell receives hydrogen from the hydrogen tank. At this time, the pressure of hydrogen supplied to the fuel cell is controlled through a hydrogen supply valve located in a line connecting the fuel cell and the hydrogen tank.

Oxygen through the air supply system as well as hydrogen is supplied to the fuel cell. In the fuel cell, water is generated due to reaction of hydrogen and oxygen, and hydrogen that is not used in the reaction is re-circulated. When the ratio of impurities contained in hydrogen is increased due to the repeated hydrogen re-circulation, a controller discharges hydrogen to an outside through the discharge valve. When hydrogen is discharged to the outside, the concentration of the hydrogen in the fuel cell is decreased, so the controller re-supplies hydrogen to increase the concentration of the hydrogen in the fuel cell.

On the other hand, the controller determines the lack or excess of hydrogen supplied to the fuel cell through the pressure of hydrogen while the fuel cell system is starting. The controller controls to increase a hydrogen supply amount when hydrogen in the fuel cell is insufficient, and controls to cut off or discharge hydrogen when the hydrogen is excessive. Further, a hydrogen leak detection sensor provided in the fuel cell system checks whether an unintended hydrogen leak occurs in the system.

However, during the start-up of the fuel cell system, both the hydrogen and the oxygen are simultaneously supplied to the fuel cell, and the amount of hydrogen in the fuel cell is reduced due to the reaction of the hydrogen and the oxygen. Thus, the lack or excess of the hydrogen supply may be easily determined. However, it is difficult to precisely determine a leak in the fuel cell or the malfunction of the hydrogen supply system using the change amount or change rate of hydrogen pressure, because there are many disturbance components. Furthermore, it is difficult to make a precise determination, so maintenance time is delayed when a failure is repaired.

The foregoing is intended merely to aid in the understanding of the background of embodiments of the present disclosure, and is not intended to mean that the present disclosure falls within the purview of the related art that is already known to those skilled in the art.

SUMMARY

The present disclosure relates to a hydrogen supply system for a fuel cell and an inspection method thereof. Particular embodiments relate to a hydrogen supply system for a fuel cell and an inspection method thereof, in which air is cut off and only hydrogen is supplied when a hydrogen supply system forming a fuel cell system is inspected, so it is delicately determined whether a component of the hydrogen supply system is defective or whether hydrogen is leaked, thus increasing maintenance efficiency and reducing maintenance time in the event of a failure.

Accordingly, embodiments of the present disclosure have been made keeping in mind problems occurring in the related art, and an embodiment of the present disclosure provides a hydrogen supply system for a fuel cell and an inspection method thereof, in which air is cut off and only hydrogen is supplied when a hydrogen supply system forming a fuel cell system is inspected, so it is delicately determined whether a component of the hydrogen supply system is defective or whether hydrogen is leaked, thus increasing maintenance efficiency and reducing maintenance time in the event of a failure.

In order to achieve the features of embodiments of the present disclosure, an embodiment of the present disclosure provides a hydrogen supply system for a fuel cell, the system including the fuel cell, a hydrogen supply line connected to an inlet side of an anode of the fuel cell and supplying hydrogen to the fuel cell, a discharge valve provided on an outlet side of the anode of the fuel cell and discharging exhaust gas of the anode of the fuel cell to an outside, and a controller cutting off air supply to the fuel cell, supplying hydrogen through the hydrogen supply line, and blocking the discharge valve, thus determining a leak in the fuel cell or the hydrogen supply line when a hydrogen-line inspection mode is performed, and opening the discharge valve to determine whether the discharge valve is defective when the fuel cell or the hydrogen supply line is normal.

The hydrogen supply system may further include a supply valve provided on the hydrogen supply line to control hydrogen supplied to the fuel cell.

The controller may control the supply valve to determine whether there is a leak in the fuel cell or the hydrogen supply line through a change in pressure of the hydrogen supplied to the fuel cell.

The hydrogen supply system may further include a pressure sensor provided on the hydrogen supply line to measure a pressure of supplied hydrogen, and the controller may determine whether there is a leak in the fuel cell or the hydrogen supply line when hydrogen is supplied to the fuel cell using a hydrogen pressure value measured by the pressure sensor.

The controller may determine whether the discharge valve is defective using a change rate or a change amount of a hydrogen pressure value measured by the pressure sensor when the discharge valve is opened.

In order to achieve the features of embodiments of the present disclosure, an embodiment of the present disclosure provides an inspection method of a hydrogen supply system for a fuel cell including cutting off air supply to the fuel cell and supplying hydrogen through a hydrogen supply line when a hydrogen-line inspection mode is performed by a controller, blocking a discharge valve by the controller when hydrogen is supplied, thus determining whether there is the leak in the fuel cell or the hydrogen supply line, and opening the discharge valve by the controller when the fuel cell or the hydrogen supply line is normal, thus determining whether the discharge valve is defective.

When the leak occurs in the fuel cell or the hydrogen supply line or the discharge valve is defective, the controller may stop starting the fuel cell.

In the determining whether there is the leak in the fuel cell or the hydrogen supply line, the controller may check whether the pressure of hydrogen supplied to the fuel cell reaches a target pressure value, may determine whether the hydrogen pressure is maintained at the target pressure value if the hydrogen pressure reaches the target pressure value, and may determine whether there is the leak in the fuel cell or the hydrogen supply line depending on whether the hydrogen pressure is maintained.

In the determining whether there is the leak in the fuel cell or the hydrogen supply line, the controller may determine that there is the leak in the hydrogen supply line, unless the hydrogen pressure reaches the target pressure value.

In the determining whether there is the leak in the fuel cell or the hydrogen supply line, the controller may close the supply valve when the hydrogen pressure reaches the target pressure value and may determine that there is no leak in the fuel cell or the hydrogen supply line when the hydrogen pressure is normally maintained at the target pressure value.

In the determining whether there is the leak in the fuel cell or the hydrogen supply line, the controller may close the supply valve when the hydrogen pressure reaches the target pressure value, may determine whether the hydrogen pressure is normally maintained at the target pressure value, may open the supply valve to maintain the target pressure value when the hydrogen pressure is not maintained at the target pressure value, and may determine that there is no leak in the fuel cell or the hydrogen supply line when an opening amount of the supply valve is less than a reference value.

In the determining whether there is the leak in the fuel cell or the hydrogen supply line, the controller may close the supply valve when the hydrogen pressure reaches the target pressure value, may determine whether the hydrogen pressure is normally maintained at the target pressure value, may open the supply valve to maintain the target pressure value when the hydrogen pressure is not maintained at the target pressure value, and may determine that there is a leak in the fuel cell or the hydrogen supply line when an opening amount of the supply valve is more than a reference value.

In the determining whether the discharge valve is defective, the controller may calculate a change amount of hydrogen pressure when the discharge valve is opened, may compare the calculated change amount with a reference change amount, and may determine that the discharge valve is defective when the calculated change amount is smaller than the reference change amount.

In the determining whether the discharge valve is defective, the controller may calculate the change amount of hydrogen pressure when the discharge valve is opened in the case that the hydrogen pressure is normally maintained at the target pressure value, may compare the calculated change amount with a reference change amount, and may determine that opening of the discharge valve is defective when the calculated change amount is smaller than the reference change amount.

In the determining whether the discharge valve is defective, the controller may calculate the change amount of hydrogen pressure when the discharge valve is opened in the case that the hydrogen pressure is not maintained at the target pressure value and the opening amount of the supply valve is less than the reference value, may compare the calculated change amount with a reference change amount, and may determine that closing of the discharge valve is defective when the calculated change amount is smaller than the reference change amount.

In the determining whether the discharge valve is defective, the controller may calculate a falling change rate of the hydrogen pressure when the discharge valve is opened in the case that the calculated change amount is greater than the reference change amount, and may determine that there is a problem in a pipe at a rear end of the discharge valve when the calculated falling change rate is smaller than the reference falling change rate.

In the determining whether the discharge valve is defective, if the hydrogen pressure drops below a reference value when the discharge valve is discharged, the controller may re-supply hydrogen to calculate a rising change rate of the hydrogen, and, in the case that the calculated rising change rate is smaller than a reference rising change rate, the controller may determine that there is a leak in the fuel cell.

A hydrogen supply system for a fuel cell and an inspection method thereof according to embodiments of the present disclosure are advantageous in that air is cut off and hydrogen is supplied during the inspection of the hydrogen supply system, thus blocking disturbance factors that interfere with the inspection.

Further, it is delicately determined whether a component of a hydrogen supply system is defective or whether hydrogen is leaked, thus reducing maintenance time when a failure is repaired, and increasing maintenance efficiency.

Furthermore, the safety of a fuel cell system is rapidly secured by preferentially checking whether there is a leak in the fuel cell system compared to a leak detection sensor.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
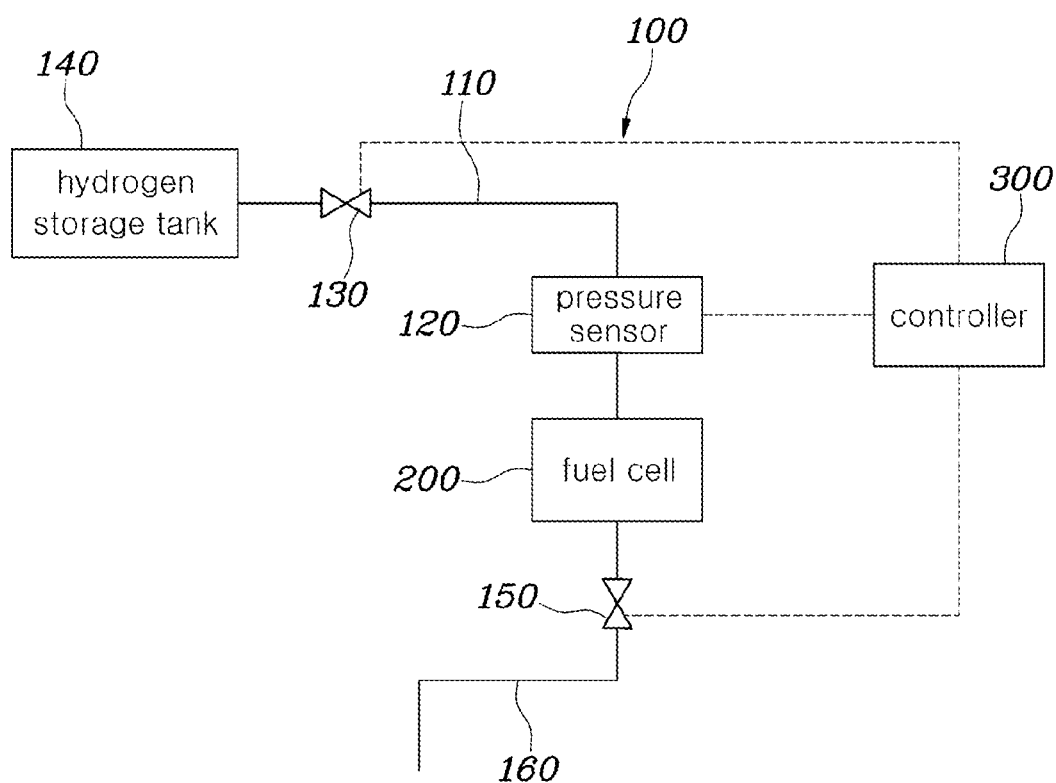
FIG. 1 is a diagram illustrating the configuration of a hydrogen supply system for a fuel cell according to an embodiment of the present disclosure.
Figure 2:
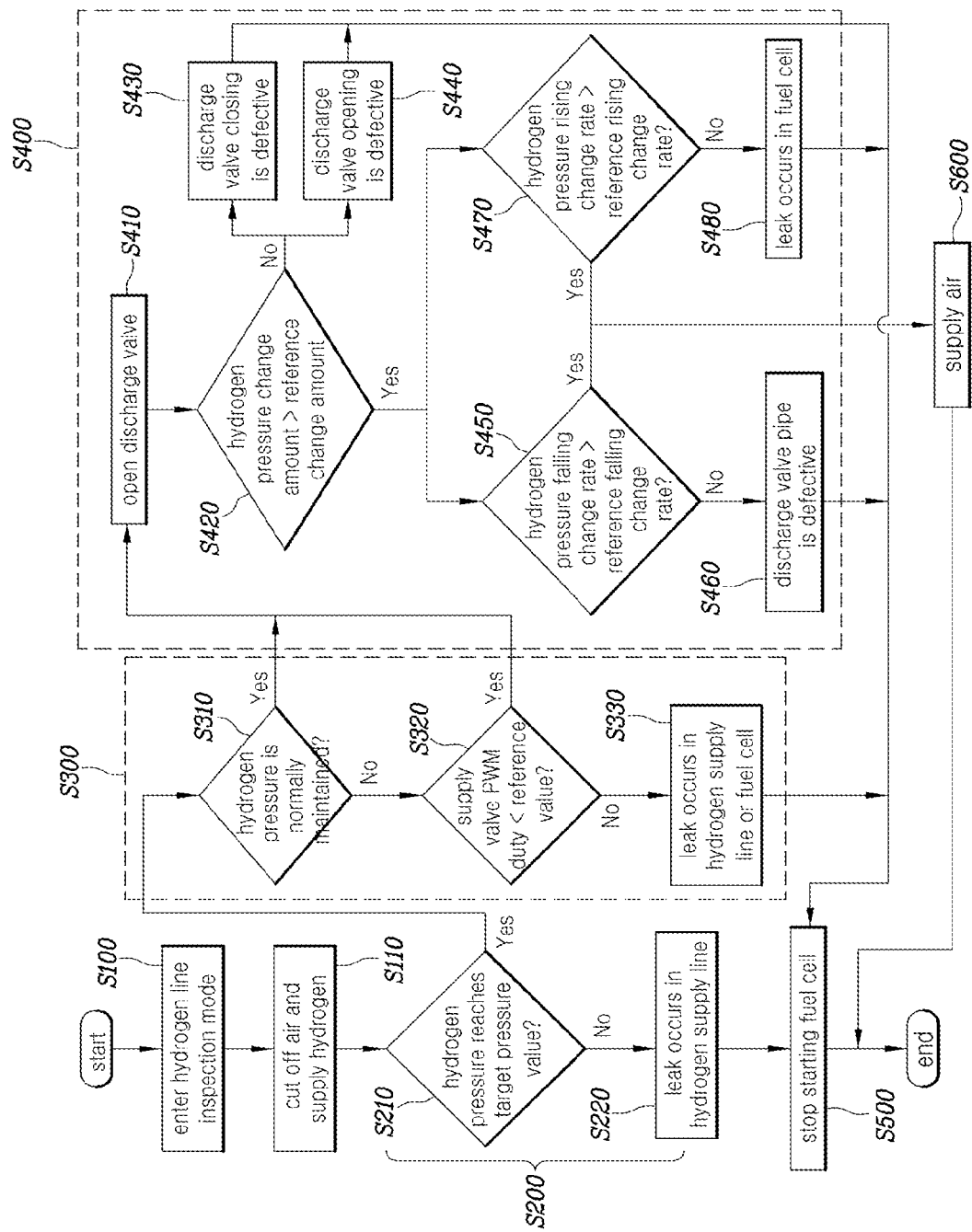
FIG. 2 is a flowchart illustrating an inspection method of a hydrogen supply system for a fuel cell according to an embodiment of the present disclosure.
Figure 3:
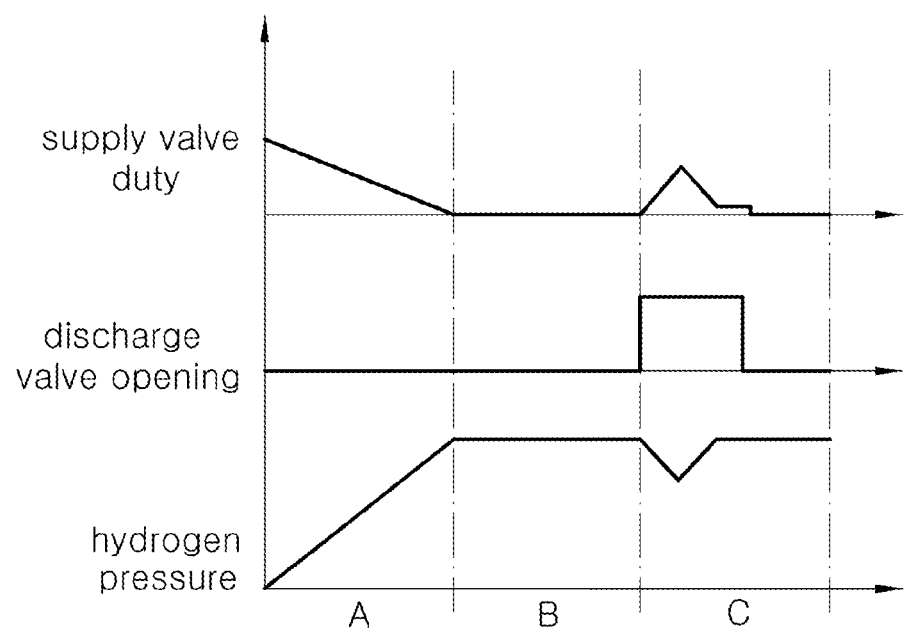
FIG. 3 is a graph illustrating a case where the hydrogen supply system for the fuel cell according to an embodiment of the present disclosure is in a normal operating state.
Figure 4:
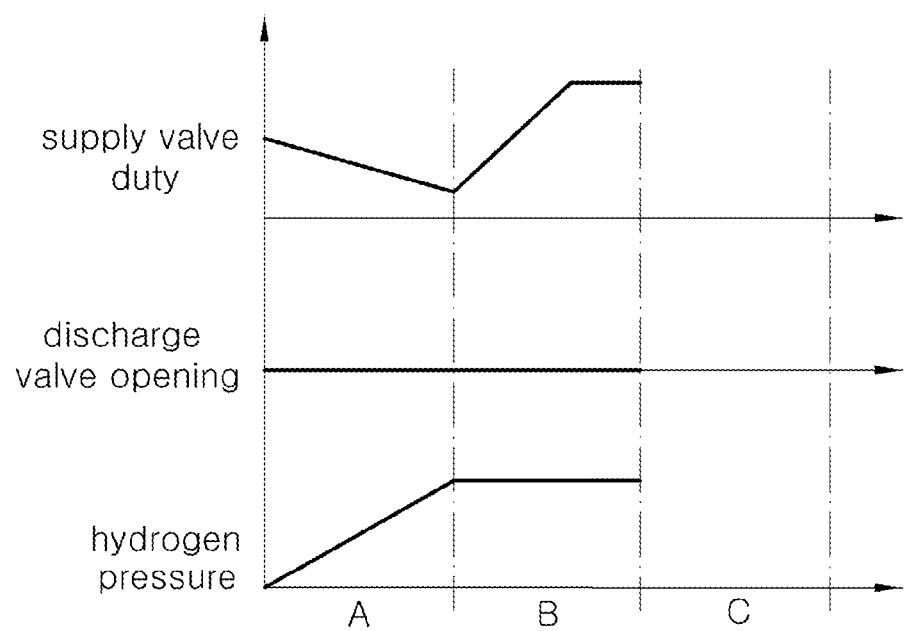
FIG. 4 is a graph illustrating a case where the pressure of hydrogen is insufficient in the hydrogen supply system for the fuel cell according to an embodiment of the present disclosure.
Figure 5:
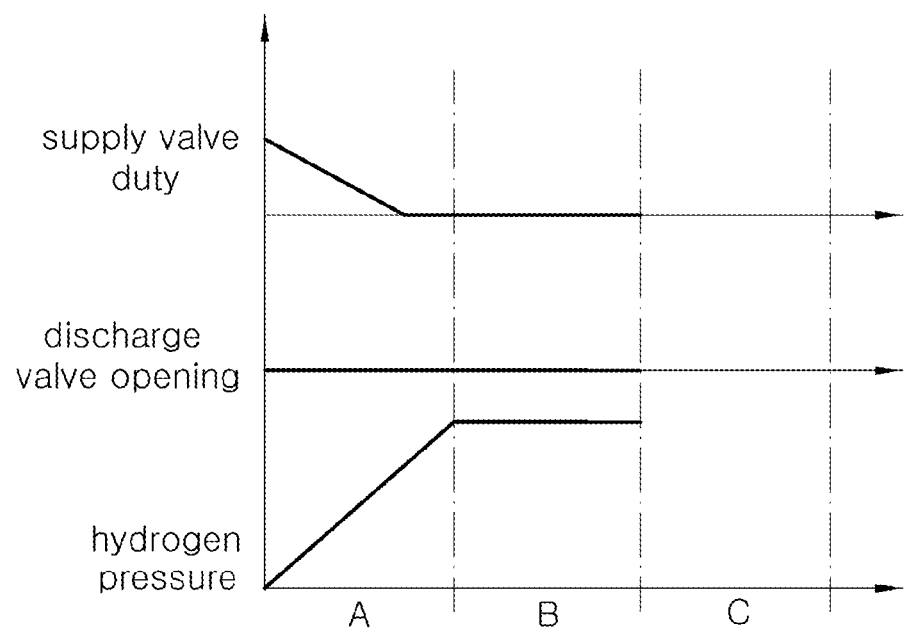
FIG. 5 is a graph illustrating a case where the pressure of hydrogen is excessive in the hydrogen supply system for the fuel cell according to an embodiment of the present disclosure.
Figure 6:
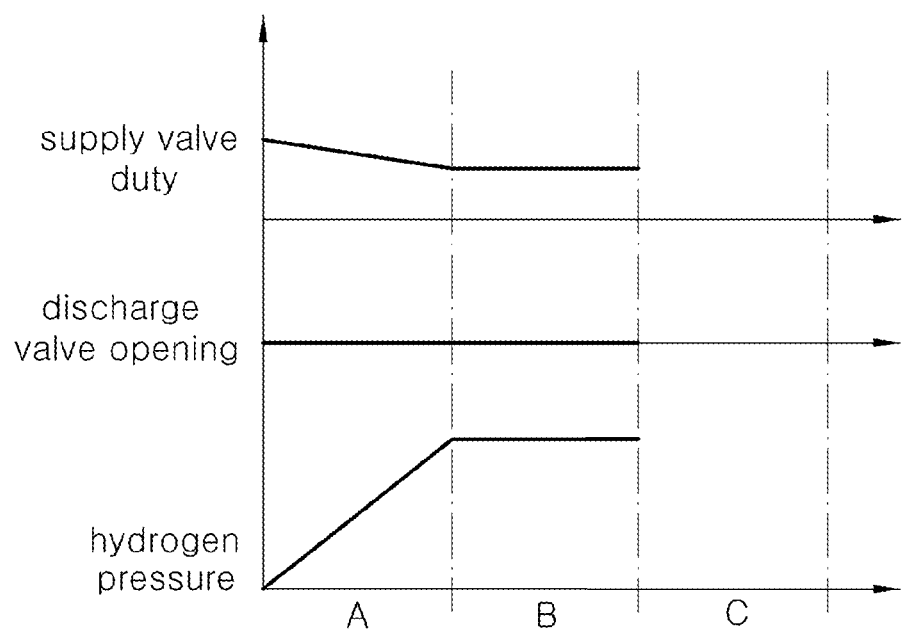
FIG. 6 is a graph illustrating a case where the duty of a supply valve is excessive in the hydrogen supply system for the fuel cell according to an embodiment of the present disclosure.
Figure 7:
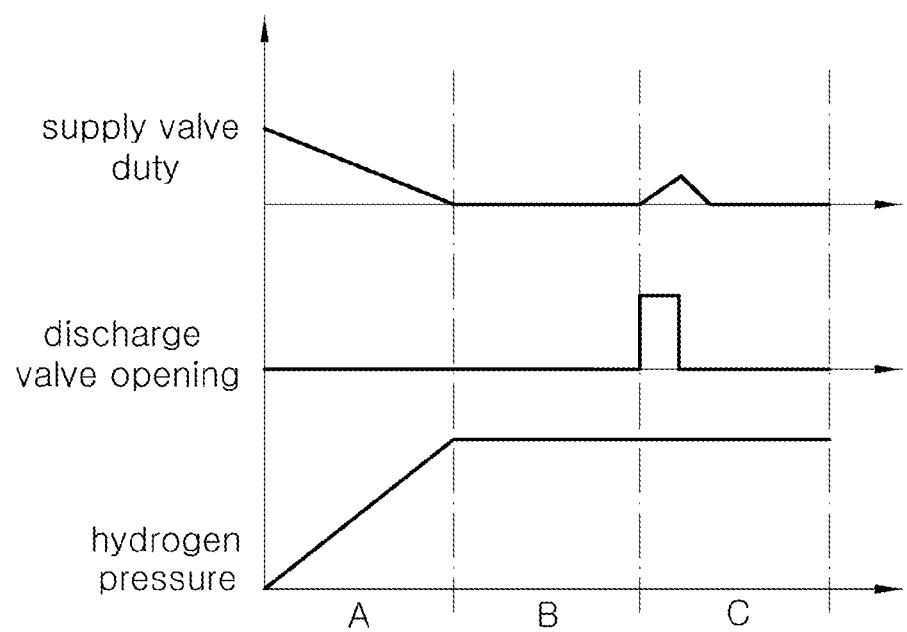
FIG. 7 is a graph illustrating a case where the opening of a discharge valve is defective in the hydrogen supply system for the fuel cell according to an embodiment of the present disclosure.
Figure 8:
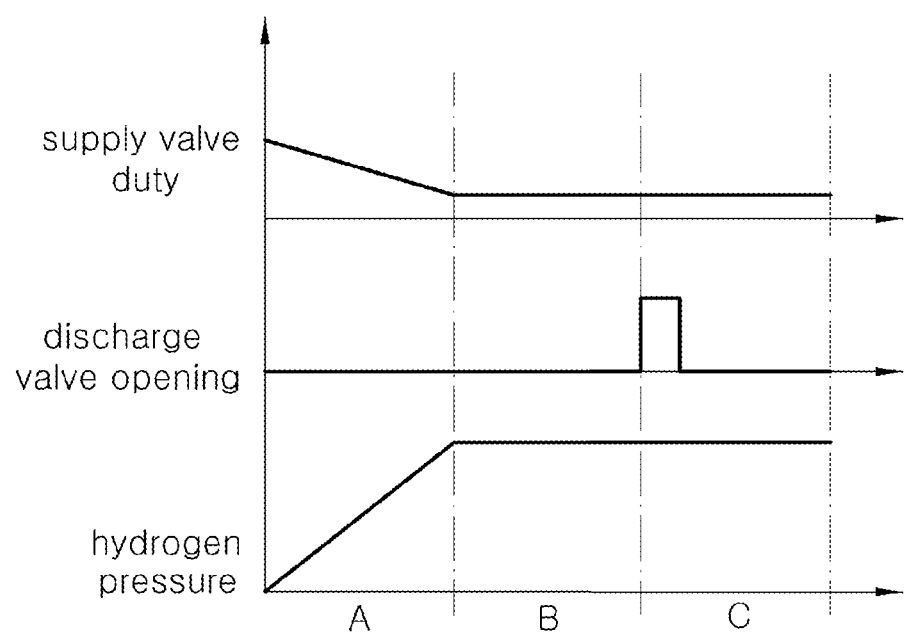
FIG. 8 is a graph illustrating a case where the closing of the discharge valve is defective in the hydrogen supply system for the fuel cell according to an embodiment of the present disclosure.
Figure 9:
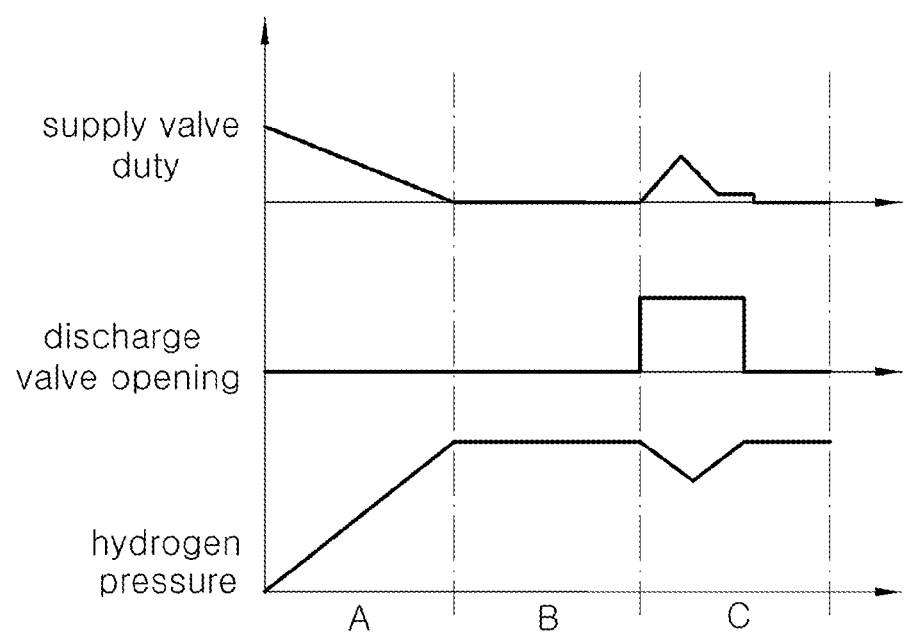
FIG. 9 is a graph illustrating a case where the pressure change rate of hydrogen is low in the hydrogen supply system for the fuel cell according to an embodiment of the present disclosure.

FIG. 1 is a diagram illustrating the configuration of a hydrogen supply system for a fuel cell according to an embodiment of the present disclosure, and FIG. 2 is a flowchart illustrating an inspection method of a hydrogen supply system for a fuel cell according to an embodiment of the present disclosure. FIG. 3 is a graph illustrating a case where the hydrogen supply system for the fuel cell according to an embodiment of the present disclosure is in a normal operating state, FIG. 4 is a graph illustrating a case where the pressure of hydrogen is insufficient in the hydrogen supply system for the fuel cell according to an embodiment of the present disclosure, and FIG. 5 is a graph illustrating a case where the pressure of hydrogen is excessive in the hydrogen supply system for the fuel cell according to an embodiment of the present disclosure. FIG. 6 is a graph illustrating a case where the duty of a supply valve is excessive in the hydrogen supply system for the fuel cell according to an embodiment of the present disclosure, FIG. 7 is a graph illustrating a case where the opening of a discharge valve is defective in the hydrogen supply system for the fuel cell according to an embodiment of the present disclosure, FIG. 8 is a graph illustrating a case where the closing of the discharge valve is defective in the hydrogen supply system for the fuel cell according to an embodiment of the present disclosure, and FIG. 9 is a graph illustrating a case where the pressure change rate of hydrogen is low in the hydrogen supply system for the fuel cell according to an embodiment of the present disclosure.

FIG. 1 is a diagram illustrating the configuration of a hydrogen supply system for a fuel cell according to an embodiment of the present disclosure. The hydrogen supply system 100 for the fuel cell 200 according to embodiments of the present disclosure includes a fuel cell 200, a hydrogen supply line no connected to an inlet side of an anode of the fuel cell 200 and supplying hydrogen to the fuel cell 200, a discharge valve 150 provided on an outlet side of the anode of the fuel cell 200 to discharge exhaust gas of the anode of the fuel cell 200 to an outside, and a controller 300 cutting off an air supply to the fuel cell 200, supplying hydrogen through the hydrogen supply line no, and blocking the discharge valve 150, thus determining a leak in the fuel cell 200 or the hydrogen supply line no when a hydrogen-line inspection mode is performed, and opening the discharge valve 150 to determine whether the discharge valve 150 is abnormal when the fuel cell 200 or the hydrogen supply line no is normal.

The controller 300 according to an exemplary embodiment of the present disclosure may be implemented through a non-volatile memory (not shown) configured to store data about an algorithm configured to control the operation of various components of a vehicle or a software instruction for reproducing the algorithm, and a processor (not shown) configured to perform an operation, which will be described below, using the data stored in the memory. In this regard, the memory and the processor may be implemented as separate chips. Alternatively, the memory and the processor may be implemented as a single integrated chip, and the processor may take the form of one or more processors.

A conventional fuel cell system supplies hydrogen through the hydrogen supply system 100 to the fuel cell 200 or discharges the remaining hydrogen after reaction in the fuel cell 200 to the outside. The controller 300 provided in the fuel cell system measures the pressure of hydrogen supplied to the fuel cell 200 to determine the lack or excess of the hydrogen supply. When hydrogen is insufficient due to reaction between hydrogen and oxygen in the fuel cell 200, the controller 300 increases a hydrogen supply amount to properly maintain the amount of hydrogen in the fuel cell 200. When the hydrogen in the fuel cell 200 is excessive, the controller 300 cuts off the supply of hydrogen and discharges hydrogen remaining after the reaction to properly maintain the amount of hydrogen in the fuel cell 200. Further, a hydrogen leak detection sensor provided in the fuel cell system detects the unintended hydrogen leak in the system.

However, the hydrogen leak detection sensor is problematic in that the determination of the hydrogen leak is delayed until a sensor periphery is enriched with the hydrogen. Further, since many disturbance components may act to determine the failure of the hydrogen supply system 100 or the occurrence of a leak in a state where hydrogen and air are supplied, maintenance time may be delayed when the failure is repaired. Thus, according to embodiments of the present disclosure, when the hydrogen supply system 100 is inspected, air is blocked and hydrogen is preferentially supplied to determine whether the hydrogen supply system 100 or the fuel cell 200 is defective.

The hydrogen storage tank 140 provided in the hydrogen supply system 100 supplies high-pressure hydrogen stored therein to the fuel cell 200. At this time, in order to control hydrogen supplied to the fuel cell 200, the hydrogen supply system 100 of the fuel cell 200 further includes a supply valve 130 that is provided on the hydrogen supply line no to control hydrogen supplied to the fuel cell 200. The controller 300 controls the supply valve 130 provided on the hydrogen supply system 100 to determine whether there is a leak in the fuel cell 200 or the hydrogen supply line no through a change in pressure of the hydrogen supplied to the fuel cell 200. Here, the controller 300 determines the opening/closing amount of the supply valve 130 when controlling the supply valve 130, using a Pulse Width Modulation (PWM) duty. The PWM duty is expressed as a percentage value. When the PWM duty is zero (0), this means that the supply valve 130 is closed. The controller 300 controls the PWM duty of the supply valve 130 when the hydrogen pressure of the hydrogen supply system 100 is maintained, thus following the hydrogen pressure as a target pressure value. Further, the controller 300 checks the excess or lack of the pressure of hydrogen supplied to the fuel cell 200, using the PWM duty value of the supply valve 130.

The hydrogen supply system 100 of the fuel cell 200 further includes a pressure sensor 120 that is provided on the hydrogen supply line no to measure the pressure of supplied hydrogen. The pressure sensor 120 periodically measures the pressure of hydrogen supplied to the fuel cell 200, and the controller 300 utilizes a hydrogen pressure value measured by the pressure sensor 120. The controller 300 determines the leak in the fuel cell 200 or the hydrogen supply line no when hydrogen is supplied, based on the hydrogen pressure value measured by the pressure sensor 120. This has the effect of preferentially checking whether there is a leak in the fuel cell system compared to the hydrogen leak detection sensor.

Furthermore, the controller 300 determines whether the discharge valve 150 is defective through the change rate or the change amount of the hydrogen pressure when the discharge valve 150 is opened. If there is no leak in the fuel cell 200 or the hydrogen supply line no when hydrogen is supplied, the controller 300 opens the discharge valve 150. By opening the discharge valve 150, exhaust gas present in the fuel cell 200 is discharged through the hydrogen discharge line 160 to the outside. However, embodiments of the present disclosure check the change rate or change amount of the hydrogen pressure when the hydrogen supplied to the fuel cell 200 is discharged again. Therefore, the embodiments of the disclosure focus on the hydrogen in the exhaust gas discharged through the discharge valve iso. Thus, the controller 300 determines whether the discharge valve 150 is defective, using the change rate or change amount of the hydrogen pressure due to the discharge of hydrogen. This enables the cause of the failure occurring on the hydrogen supply system 100 to be easily identified, and reduces a maintenance time to enhance maintenance efficiency.

A detailed determination method in the hydrogen supply system 100 of the fuel cell 200 will be described in an inspection method that will be mentioned later.

FIG. 2 is a flowchart illustrating an inspection method of a hydrogen supply system for a fuel cell according to an embodiment of the present disclosure. The inspection method of the hydrogen supply system 100 for the fuel cell 200 according to embodiments of the present disclosure includes a step S110 of cutting off the supply of air to the fuel cell 200 and supplying hydrogen through the hydrogen supply line no, when a hydrogen-line inspection mode is performed by the controller 300, steps S200 and S300 of blocking the discharge valve 150 by the controller 300 when hydrogen is supplied, thus determining whether there is the leak in the fuel cell 200 or the hydrogen supply line no, and a step S400 of opening the discharge valve 150 by the controller 300 when the fuel cell 200 or the hydrogen supply line no is normal, thus determining whether the discharge valve 150 is defective.

FIGS. 3 to 9 are graphs showing changes in the inspection method of the hydrogen supply system 100 for the fuel cell 200 according to an embodiment of the present disclosure. FIG. 3 is a graph illustrating a case where the hydrogen supply system for the fuel cell according to an embodiment of the present disclosure is in a normal operating state, FIG. 4 is a graph illustrating a case where the pressure of hydrogen is insufficient in the hydrogen supply system for the fuel cell according to an embodiment of the present disclosure, and FIG. 5 is a graph illustrating a case where the pressure of hydrogen is excessive in the hydrogen supply system for the fuel cell according to an embodiment of the present disclosure. Further, FIG. 6 is a graph illustrating a case where the duty of a supply valve is excessive in the hydrogen supply system for the fuel cell according to an embodiment of the present disclosure, FIG. 7 is a graph illustrating a case where the opening of a discharge valve is defective in the hydrogen supply system for the fuel cell according to an embodiment of the present disclosure, FIG. 8 is a graph illustrating a case where the closing of the discharge valve is defective in the hydrogen supply system for the fuel cell according to an embodiment of the present disclosure, and FIG. 9 is a graph illustrating a case where the pressure change rate of hydrogen is low in the hydrogen supply system for the fuel cell according to an embodiment of the present disclosure.

Referring to the flowchart illustrating the inspection method of the hydrogen supply system 100 for the fuel cell 200 of FIG. 2 that will be mentioned later, a difference between the normal operating state and each step in the inspection may be easily identified. A, B, and C shown in the graphs mean steps into which the inspection method of the hydrogen supply system 100 for the fuel cell 200 is largely divided. A is the step in which air is blocked and hydrogen is supplied, and B is the step in which hydrogen is supplied and the supply valve 130 is closed to maintain hydrogen pressure. Further, C is the step in which the discharge valve 150 is opened, hydrogen is discharged, and the supply valve 130 is opened, thus keeping the hydrogen pressure, which drops due to the discharge of the hydrogen, constant. FIGS. 4 to 9 are graphs showing a case where a problem occurs in each step of the inspection method of the hydrogen supply system 100 for the fuel cell 200, and a difference from the normal operating state may be easily checked through comparison with FIG. 3.

First, as shown in FIG. 2, the controller 300 performs the hydrogen-line inspection mode to inspect the hydrogen supply system 100 for the fuel cell 200 (S100). When the hydrogen-line inspection mode is performed, the controller 300 blocks air supplied to the fuel cell 200 and preferentially supplies hydrogen through the hydrogen supply line no (S110). Further, when a leak occurs in the fuel cell 200 or the hydrogen supply line no or the discharge valve 150 is defective in the hydrogen-line inspection mode, the controller 300 stops starting the fuel cell 200 (S500). When the leak occurs in the fuel cell 200 or the hydrogen supply line no, the leaked hydrogen may cause a problem in the safety of the fuel cell system. Therefore, the controller 300 stops starting the fuel cell 200, thus securing the safety of the fuel cell system from the leaked hydrogen.

To be more specific, when hydrogen is supplied to the fuel cell 200, the pressure sensor 120 measures the pressure of the supplied hydrogen. A target pressure value for maintaining a proper amount of hydrogen in the fuel cell 200 is present, and the controller 300 needs to control the pressure of hydrogen supplied to the fuel cell 200 to reach the target pressure value. In steps S200 and S300 of determining whether there is a leak in the fuel cell 200 or the hydrogen supply line no, the controller 300 checks whether the pressure of hydrogen supplied to the fuel cell 200 reaches the target pressure value (S210). Further, if the pressure of hydrogen reaches the target pressure value, it is determined whether the hydrogen pressure is maintained at the target pressure value (S310), and the controller determines whether there is the leak in the fuel cell or the hydrogen supply line depending on whether the hydrogen pressure is maintained (S330).

First, in steps S200 and S300 of determining whether there is the leak in the fuel cell 200 or the hydrogen supply line no, the controller 300 determines whether the pressure of hydrogen reaches the target pressure value (S210). The controller 300 opens the supply valve 130, and determines whether the pressure of hydrogen supplied to the fuel cell 200 reaches a preset target pressure value. Thus, it may be determined whether the hydrogen stored in the hydrogen storage tank 140 is normally supplied to the fuel cell 200. When the hydrogen pressure does not reach the target pressure value, the controller 300 determines that the leak occurs in the hydrogen supply line no (S220). Particularly, when the hydrogen pressure is less than the target pressure value, the controller 300 may determine that the leak occurs in the hydrogen supply line no or a connecting part at which the hydrogen supply line no and the fuel cell 200 are connected. Referring to FIGS. 3 and 4, it can be seen that a lower hydrogen pressure is supplied as shown in FIG. 4 compared to the normal operating state of FIG. 3. When the hydrogen pressure reaches the target pressure value, the duty of the supply valve 130 should converge on zero as shown in FIG. 3. The convergence of the duty of the supply valve 130 on zero means that the supply valve 130 is closed. However, since the hydrogen pressure is lower than the target pressure value due to the leak in the hydrogen supply line 110 or the connecting part as shown in FIG. 4, the duty of the supply valve 130 may not converge on zero so as to match the hydrogen pressure.

Further, when the hydrogen pressure is excessively larger than the target pressure value, the controller 300 may determine that the leak occurs in the supply valve 130 provided on the hydrogen supply line 110. Referring to FIGS. 3 and 5, it can be seen that higher hydrogen pressure is supplied as shown in FIG. 5, as compared to the normal operating state of FIG. 3. When hydrogen pressure higher than the target pressure value is supplied, as shown in FIG. 5, the duty of the supply valve 130 converges on zero at a point where the hydrogen pressure reaches the target pressure value. It can be seen that the leak occurs in the supply valve 130 because the duty of the supply valve 130 already converges on zero before the supply of hydrogen is completed and the hydrogen pressure is measured to be higher than the target pressure value. When the leak occurs in the hydrogen supply line 110 or the supply valve 130, the controller 300 stops starting the fuel cell 200 (S500), thus securing the safety of the fuel cell system, and allowing a failure to be repaired. Therefore, the controller 300 determines whether the pressure of hydrogen supplied to the fuel cell 200 reaches the target pressure value, so it is possible to quickly determine whether there is a problem with the hydrogen supply line 110 for supplying hydrogen.

Subsequently, in steps S200 and S300 of determining whether there is the leak in the fuel cell 200 or the hydrogen supply line 110, the controller 300 closes the supply valve 130 if the hydrogen pressure reaches the target pressure value. When the hydrogen pressure is normally maintained at the target pressure value, it is determined that there is no leak in the fuel cell 200 or the hydrogen supply line no. The controller 300 determines whether the hydrogen pressure is maintained at the target pressure value if the hydrogen pressure reaches the target pressure value (S310). The controller 300 checks the Pulse Width Modulation (PWM) duty of the supply valve 130 and determines whether the hydrogen pressure is maintained using the checked PWM duty. This can be said to be a preceding step for checking an airtight state in the fuel cell 200 or on the hydrogen supply system 100. If a leak occurs in the fuel cell 200 or the hydrogen supply line no, the controller 300 needs to control the supply valve 130 so as to follow the hydrogen pressure as the target pressure value. When the supply valve 130 is controlled, the opening/closing amount of the supply valve 130 is determined by the PWM duty. When the leak occurs in the fuel cell 200 or the hydrogen supply line no, the PWM duty of the supply valve 130 is changed. When no leak occurs in the fuel cell 200 or the hydrogen supply line no and thus it is unnecessary to open the supply valve 130, the PWM duty converges on zero as shown in section B of FIG. 3.

Therefore, the controller 300 determines whether the supply valve 130 is opened, using a change in the PWM duty of the supply valve 130. In steps S200 and S300 of determining whether there is the leak in the fuel cell 200 or the hydrogen supply line no, the controller 300 opens the supply valve 130 to maintain the target pressure value when the hydrogen pressure is not maintained at the target pressure value and determines whether there is no leak in the fuel cell 200 or the hydrogen supply line no when the opening amount of the supply valve 130 is less than a reference value. The controller 300 checks whether the pressure of hydrogen supplied to the fuel cell 200 is maintained at the target pressure value (S310). When the hydrogen pressure is not maintained at the target pressure value, the controller 300 opens the supply valve 130. Further, it is checked whether the PWM duty of the supply valve 130 is less than a reference value (S320). However, when the supply valve 130 is opened and the PWM duty of the supply valve 130 replacing the opening amount of the supply valve 130 is less than the reference value, it is determined that there is no leak in the fuel cell 200 or the hydrogen supply line no. When the PWM duty of the supply valve 130 is less than the set reference value, a fine leak occurs in the fuel cell 200 or the hydrogen supply line no, but it is necessary to determine the detailed cause through an additional inspection step.

However, the controller 300 opens the supply valve 130 to maintain the target pressure value when the hydrogen pressure is not maintained at the target pressure value, and determines that there is the leak in the fuel cell 200 or the hydrogen supply line no when the opening amount of the supply valve 130 exceeds the reference value (S330). When the PWM duty of the supply valve 130 exceeds the reference value, the controller 300 determines that the leak occurs in the fuel cell 200 or the hydrogen supply line no. Referring to FIGS. 3 and 6, it can be seen that the hydrogen pressure has the same graph, but the duty of the supply valve 130 has different graphs. As shown in FIG. 6, it is necessary to open the supply valve 130 so as to maintain the hydrogen pressure as the target pressure value, and the duty of the supply valve 130 has a value other than zero. Even if the hydrogen pressure is maintained at the target pressure value, it can be seen that the leak occurs in the fuel cell 200 or the hydrogen supply line no by checking a difference in the duty graph of the supply valve 130.

For the safety of the fuel cell system, the controller 300 stops starting the fuel cell 200 (S500), so a problem may be checked. When the hydrogen is supplied to the fuel cell 200, only the hydrogen is supplied, so it is possible to check whether the hydrogen supply system 100 is normal using the hydrogen pressure value. Further, when the hydrogen supply system 100 is not normal due to the leak, a device in which the leak occurs is quickly determined, thus shortening maintenance time and increasing maintenance efficiency.

Subsequently, when the inspection of the leak occurring in the fuel cell 200 or the hydrogen supply line no is completed, it is checked whether the discharge valve on the hydrogen supply system 100 is defective (S400). At this time, the controller 300 opens the discharge valve 150 to discharge hydrogen (S410). The controller 300 opens the discharge valve 150 to determine the detailed cause based on the result of the preceding step for checking the airtightness of the inside of the fuel cell 200 and the hydrogen supply system 100. When determining the detailed cause, the controller 300 needs to determine whether the operation of the discharge valve 150 is defective. Thus, in the step of determining whether the discharge valve 150 is defective, the controller 300 calculates the change amount of hydrogen pressure when the discharge valve 150 is opened, compares the calculated change amount with a reference change amount (S420), and determines that the discharge valve 150 is defective when the calculated change amount is smaller than the reference change amount (S430, S440). First, the controller 300 calculates the change amount of hydrogen pressure when the discharge valve 150 is opened. When the discharge valve 150 is opened, hydrogen is discharged to the outside, so the pressure of the hydrogen is reduced. If there is no defect in the discharge valve iso, the change amount of the hydrogen pressure exceeds the reference change amount. However, when the discharge valve 150 is defective, the change amount of the hydrogen pressure is changed to be smaller than the reference change amount.

In step S400 of determining whether the discharge valve 150 is defective, the controller 300 determines the defect based on the result of the preceding step. When the hydrogen pressure is normally maintained at the target pressure value in the preceding step, the controller 300 determines that the opening of the discharge valve 150 is defective if the calculated change amount is smaller than the reference change amount (S430). Since the hydrogen pressure is normally maintained at the target pressure value in the preceding step and thus there is no leak in the fuel cell 200 or the hydrogen supply line no, if the change amount by which the hydrogen pressure is reduced during the hydrogen discharge is smaller than the reference change amount, this means that the discharge is not good. The difference may be checked by comparing FIGS. 3 and 7. In the case of the normal operating state as shown in FIG. 3, if the discharge valve 150 is opened, the hydrogen pressure should be reduced. However, even if the discharge valve 150 is opened as shown in FIG. 7, it can be seen that there is no change in the hydrogen pressure. This may be determined that the opening of the discharge valve 150 is defective, so the discharge is not performed. Therefore, when the change amount of the hydrogen pressure is smaller than the reference change amount, the controller 300 may determine that the opening of the discharge valve 150 is defective.

However, when the hydrogen pressure is not normally maintained at the target pressure value in the preceding step and the opening amount of the supply valve 130 is less than the reference value, it is determined that the closing of the discharge valve 150 is defective if the calculated change amount of the hydrogen pressure is smaller than the reference change amount (S440). When the hydrogen pressure is not normally maintained at the target pressure value in the preceding step, the controller 300 controls the PWM duty of the supply valve 130 to be less than the reference value, and determines that there is a fine leak in the fuel cell 200 or the hydrogen supply line no. Nevertheless, when the change amount of the hydrogen pressure in the hydrogen discharge is less than the reference change amount, it means that hydrogen is continuously discharged. The continuous hydrogen discharge means that a problem occurs in the closing of the discharge valve 150. At this time, the controller 300 determines that the closing of the discharge valve 150 is defective. Referring to FIGS. 3 and 8, in the normal operating state of FIG. 3, the hydrogen pressure is changed by opening the discharge valve iso. However, as shown in FIG. 8, since there is no change in hydrogen pressure even if the discharge valve 150 is opened, it can be seen that there is a problem in the discharge valve iso. In order to clearly determine the problem of the discharge valve iso, the difference from FIG. 7 can be seen from the duty change graph of the supply valve 130 shown in FIG. 8. As shown in FIG. 8, when the discharge valve 150 is opened and closed, the duty of the supply valve 130 does not converge on zero. This means that the supply valve 130 is opened to maintain the hydrogen pressure, because the hydrogen is continuously discharged even when the discharge valve 150 is closed. Therefore, when the graph of the hydrogen supply system 100 is shown as in FIG. 8, it may be determined that there is a problem in the closing of the discharge valve 150.

Further, when the controller 300 determines that the opening or closing of the discharge valve 150 is defective (S430, S440), the controller 300 controls to stop starting the fuel cell 200, thus securing the safety of the fuel cell system due to the leak of hydrogen (S500).

On the other hand, in step S400 of determining whether the discharge valve 150 is defective, the controller 300 calculates the falling change rate of the hydrogen pressure when the discharge valve 150 is opened in the case that the calculated change amount is greater than the reference change amount. Further, the calculated falling change rate of the hydrogen pressure is compared with a reference falling change rate (S450). When the calculated falling change rate is smaller than the reference falling change rate, it is determined that there is a problem in a pipe at the rear end of the discharge valve 150 (S460). If the change amount of the hydrogen pressure is larger than the reference change amount during the opening of the discharge valve 150, so hydrogen is smoothly discharged, the hydrogen pressure is decreased with a certain gradient. If the calculated falling change rate of the hydrogen pressure is smaller than the set reference falling change rate during the opening of the discharge valve iso, the controller 300 determines that there is no problem in the discharge valve 150 but the pipe connected to the rear end of the discharge valve 150 is blocked. When the discharge of hydrogen is not smooth due to blockage of the pipe at the rear end of the discharge valve 150, it is impossible to secure an appropriate hydrogen concentration inside the fuel cell 200. Thus, the controller 300 controls to stop starting the fuel cell 200 in order to prevent the durability of the fuel cell 200 from being deteriorated (S500).

Subsequently, in step S400 of determining whether the discharge valve 150 is defective (S400), if the hydrogen pressure drops below a reference value during the opening of the discharge valve 150, the controller 300 re-supplies hydrogen to calculate the rising change rate of the hydrogen pressure. Further, the controller 300 compares the calculated rising change rate of the hydrogen pressure with a reference rising change rate (S470). When the calculated rising change rate is smaller than the reference rising change rate, the controller 300 determines that there is a leak in the fuel cell 200 (S480). In order to follow the hydrogen pressure, which is reduced due to the opening of the discharge valve 150, as the target pressure value, the controller 300 increases the PWM duty of the supply valve 130. Due to an increase in the PWM duty of the supply valve 130, hydrogen is supplied again through the supply valve 130, and the hydrogen pressure is increased. If a leak occurs in the discharge valve 150 or a place other than the discharge valve iso, the rising change rate of the hydrogen pressure has a value lower than the reference rising change rate. At this time, if the hydrogen pressure is not maintained normally and the opening amount of the supply valve 130 is less than the reference value, the controller 300 determines that the leak occurs in the fuel cell 200. The difference may be compared with reference to FIGS. 3 and 9.

After the discharge valve 150 is opened, the change in the falling change rate or the rising change rate of the hydrogen pressure does not affect the duty of the supply valve 130 and the opening and closing of the discharge valve iso. Therefore, it can be checked whether a problem occurs by comparing a gradient of the falling or rising section of the hydrogen pressure in the normal operating state of FIG. 3 with a gradient of the falling or rising section of the hydrogen pressure of FIG. 9. As shown in FIG. 9, when the gradient of the falling section of the hydrogen pressure is smaller than the gradient of the falling section of the hydrogen pressure in the normal operating state, this means that hydrogen is not discharged smoothly. However, since there is no problem in the opening or closing of the discharge valve 150 as shown in FIG. 9, it is determined whether the pipe connected to the rear end of the discharge valve 150 is blocked. Further, when the gradient of the rising section of the hydrogen pressure is smaller than the gradient of the rising section of the hydrogen pressure in the normal operating state, it is determined whether a leak occurs in the fuel cell 200.

Further, when the leak occurs in the fuel cell 200, the controller 300 stops starting the fuel cell 200 so as to secure the safety of the fuel cell system due to the leaked hydrogen (S500). Thus, even if there is no problem in a supply path of the hydrogen supply system 100, it is possible to quickly identify a problem in a discharge path of the hydrogen supply system 100 through the discharge of hydrogen. Furthermore, maintenance time is reduced and maintenance efficiency is enhanced by identifying the problem and performing appropriate performance.

The controller 300 supplies air when hydrogen is normally supplied through all inspection processes, there is no leak in the fuel cell 200 or the hydrogen supply line no, and the discharge valve 150 is normally operated (S600). In this way, the hydrogen-line inspection mode completes all operations. Thereafter, air is supplied, so the fuel cell 200 generates power and performs normal power generation.

As described above, embodiments of the present disclosure provide a hydrogen supply system for a fuel cell and an inspection method thereof, in which air is cut off and hydrogen is supplied during the inspection of the hydrogen supply system, thus blocking disturbance factors that interfere with the inspection.

Further, it is delicately determined whether a component of a hydrogen supply system is defective or whether hydrogen is leaked, thus reducing maintenance time when a failure is repaired and increasing maintenance efficiency.

Furthermore, the safety of a fuel cell system is rapidly secured by preferentially checking whether there is a leak in the fuel cell system compared to a leak detection sensor.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A hydrogen supply system comprising:
   a fuel cell;
   a hydrogen supply line connected to an inlet side of an anode of the fuel cell;
   a discharge valve provided on an outlet side of the anode of the fuel cell to discharge exhaust gas of the anode of the fuel cell to an outside of the fuel cell; and
   a controller configured to perform a hydrogen-line inspection mode to determine whether there is a leak in the fuel cell or the hydrogen supply line by:
      cutting off air supply to the fuel cell;
      supplying hydrogen through the hydrogen supply line;
      blocking the discharge valve; and
      opening the discharge valve to determine whether the discharge valve is defective in response to a determination that the fuel cell and the hydrogen supply line are normal.

2. The hydrogen supply system of claim 1, further comprising a supply valve provided on the hydrogen supply line and configured to control hydrogen supplied to the fuel cell.

3. The hydrogen supply system of claim 2, wherein the controller is configured to control the supply valve to determine whether there is the leak in the fuel cell or the hydrogen supply line through a change in pressure of the hydrogen supplied to the fuel cell.

4. The hydrogen supply system of claim 1, further comprising a pressure sensor provided on the hydrogen supply line and configured to measure a pressure of supplied hydrogen.

5. The hydrogen supply system of claim 4, wherein the controller is configured to determine whether there is the leak in the fuel cell or the hydrogen supply line when the hydrogen is supplied to the fuel cell using a hydrogen pressure value measured by the pressure sensor.

6. The hydrogen supply system of claim 5, wherein the controller is configured to determine whether the discharge valve is defective using a change rate or a change amount of the hydrogen pressure value measured by the pressure sensor when the discharge valve is opened.

7. An inspection method of a hydrogen supply system for a fuel cell, the method comprising:
   cutting off air supply to the fuel cell and supplying hydrogen through a hydrogen supply line when a hydrogen-line inspection mode is performed by a controller;
   blocking a discharge valve by the controller when the hydrogen is supplied to determine whether there is a leak in the fuel cell or the hydrogen supply line, wherein the discharge valve is configured to discharge exhaust gas of an anode of the fuel cell to an outside of the fuel cell; and
   opening the discharge valve by the controller when the fuel cell and the hydrogen supply line are normal to determine whether the discharge valve is defective.

8. The method of claim 7, wherein, in response to a determination that the leak occurs in the fuel cell or the hydrogen supply line or the discharge valve is defective, the method further comprises stopping starting of the fuel cell by the controller.

9. The method of claim 7, wherein determining whether there is the leak in the fuel cell or the hydrogen supply line further comprises:
   checking whether a pressure of the hydrogen supplied to the fuel cell reaches a target pressure value;
   determining whether hydrogen pressure is maintained at the target pressure value if the hydrogen pressure reaches the target pressure value; and
   determining whether there is the leak in the fuel cell or the hydrogen supply line based on whether the hydrogen pressure is maintained.

10. The method of claim 9, wherein determining whether there is the leak in the fuel cell or the hydrogen supply line further comprises determining that there is the leak in the hydrogen supply line unless the hydrogen pressure reaches the target pressure value.

11. The method of claim 9, wherein determining whether there is the leak in the fuel cell or the hydrogen supply line further comprises:

closing a supply valve provided on the hydrogen supply line when the hydrogen pressure reaches the target pressure value; and determining that there is no leak in the fuel cell or the hydrogen supply line when the hydrogen pressure is normally maintained at the target pressure value.

12. The method of claim 9, wherein determining whether there is the leak in the fuel cell or the hydrogen supply line further comprises:

closing a supply valve provided on the hydrogen supply line when the hydrogen pressure reaches the target pressure value;

determining whether the hydrogen pressure is normally maintained at the target pressure value;

opening the supply valve to maintain the target pressure value when the hydrogen pressure is not maintained at the target pressure value; and determining that there is no leak in the fuel cell or the hydrogen supply line when an opening amount of the supply valve is less than a reference value.

13. The method of claim 9, wherein determining whether there is the leak in the fuel cell or the hydrogen supply line further comprises:

closing a supply valve provided on the hydrogen supply line when the hydrogen pressure reaches the target pressure value;

determining whether the hydrogen pressure is normally maintained at the target pressure value;

opening the supply valve to maintain the target pressure value when the hydrogen pressure is not maintained at the target pressure value; and determining that there is the leak in the fuel cell or the hydrogen supply line when an opening amount of the supply valve is more than a reference value.

14. The method of claim 7, wherein determining whether the discharge valve is defective further comprises:

calculating a change amount of hydrogen pressure when the discharge valve is opened;

comparing the calculated change amount with a reference change amount; and determining that the discharge valve is defective when the calculated change amount is smaller than the reference change amount.

15. The method of claim 14, wherein determining whether the discharge valve is defective further comprises:

calculating the change amount of the hydrogen pressure when the discharge valve is opened in response to the hydrogen pressure being normally maintained at a target pressure value;

comparing the calculated change amount with the reference change amount; and determining that opening of the discharge valve is defective when the calculated change amount is smaller than the reference change amount.

16. The method of claim 14, wherein determining whether the discharge valve is defective further comprises:

calculating the change amount of the hydrogen pressure when the discharge valve is opened in response to the hydrogen pressure not being maintained at a target pressure value and an opening amount of a supply valve provided on the hydrogen supply line being less than a reference value;

comparing the calculated change amount with the reference change amount; and determining that closing of the discharge valve is defective when the calculated change amount is smaller than the reference change amount.

17. The method of claim 14, wherein determining whether the discharge valve is defective further comprises:

calculating a falling change rate of the hydrogen pressure when the discharge valve is opened in response to the calculated change amount being greater than the reference change amount; and determining that there is a problem in a pipe at a rear end of the discharge valve when the calculated falling change rate is smaller than a reference falling change rate.

18. The method of claim 7, wherein determining whether the discharge valve is defective further comprises:

re-supplying hydrogen to calculate a rising change rate of the hydrogen if hydrogen pressure drops below a reference value when the discharge valve is discharged; and in response to a determination that the calculated rising change rate is smaller than a reference rising change rate, determining that there is the leak in the fuel cell.

* * * * *